United States Patent [19]

Nestler

[11] Patent Number: 4,716,287

[45] Date of Patent: Dec. 29, 1987

[54] LIGHT PIPE FOR AN OPTICAL MOUSE

[75] Inventor: Eric Nestler, Cambridge, Mass.

[73] Assignee: Symbolics Inc., Cambridge, Mass.

[21] Appl. No.: 773,403

[22] Filed: Sep. 6, 1985

[51] Int. Cl.[4] .......................... G09G 1/00; H01J 5/16
[52] U.S. Cl. .................................. 250/227; 250/221;
350/96.25; 340/710
[58] Field of Search ................ 250/227, 221; 340/710;
350/96.15, 96.30, 96.29, 96.33, 96.25

[56] References Cited

U.S. PATENT DOCUMENTS 3,279,903 10/1966 Siegmund ..................... 350/96.29
4,521,772 6/1985 Lyon .................................. 340/710

Primary Examiner—Edward P. Westin
Attorney, Agent, or Firm—Sprung Horn Kramer & Woods

[57] ABSTRACT

A light pipe for use in an optical mouse comprises a block of light transmitting fibers comprising a plurality of parallel light transmissive regular polygonal fiber cores each surrounded by light transmissive cladding having a lower index of refraction than the core. The ratio of the width of the core to the thickness of the cladding ranges from 4 to 24.

7 Claims, 4 Drawing Figures

LIGHT PIPE FOR AN OPTICAL MOUSE

BACKGROUND OF THE INVENTION

The present invention is directed to an improvement in an optical mouse, in particular, the device for transmitting light from the object surface to the sensing surface of an optical mouse.

The present application references the prior U.S. application Ser. No. 604,111 filed Apr. 16, 1984, assigned to the same assignee as the present applicant and the contents of which are incorporated herein by reference.

In that application an optical mouse was described wherein a device for transmitting light from an object surface to a sensing surface included a multiple element lens system or a fiber optic coupler.

In an optical lens system of that type, the field of view has the requirement of being about 8 mm in diameter with an image reduction of between 1:1 to 1:1.5 at the sensing surface. The multiple element design disclosed in the prior application must have an optical length of less than 0.75" to keep the mouse package small. In order to achieve the state requirements, the multiple element system to be utilized therein is relatively expensive given the overall cost of the optical mouse.

The prior application also suggested the use of fiber optic bundle.

While the use of a standard fiber optic bundle is operable, from the known technique of, for example, using two flexible coherent light pipes, this device also has the disadvantage of being too expensive in a mouse device since it necessitates passing light into one group of cores and removing the image from another group of cores and passing the light back to the sensing surface.

SUMMARY OF THE INVENTION

The main object of the present invention is to provide a light transmitting device or light pipe which is specifically designed for use with an optical mouse and which is inexpensive and meets the optical requirements of the overall system.

These and other objects of the present invention are achieved in accordance with the present invention by a light pipe comprising a coherent rigid fused or nonrigid partially fused block of fiber cores which are shaped or milled into the necessary dimensions for use in the optical mouse.

In accordance with the present invention, a single fiber optic bundle is utilized wherein the fiber core and the cladding are clear glass which are able to pass light both axially and radially. Since light can be made to pass radially through the fiber bundle, if light is directed at an angle, towards the object surface, some percentage of the light will reach the object surface and illuminate the object. The object will reflect a portion of this light back upwardly and the reflected image light will be captured by the individual optical fiber cores and this light will be transmitted back up the fiber bundle to the sensing surface.

These and other features of the present invention will be described in detail with reference to the following specification and drawings wherein:

DETAILED DESCRIPTION OF THE INVENTION

Figure 1:
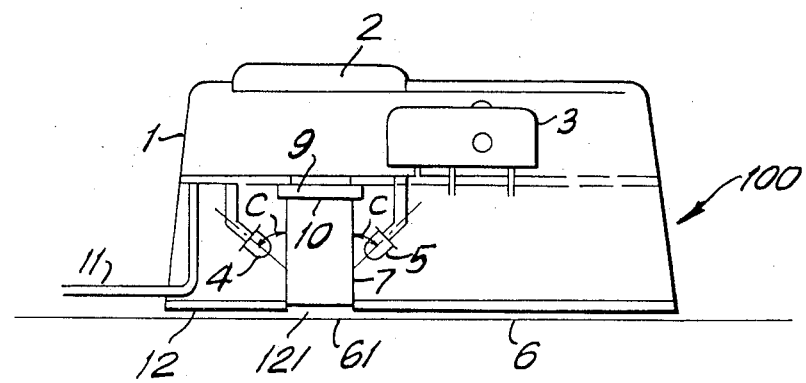
FIG. 1 is a schematic view of the internal structure of an optical mouse with the present invention.

FIG. 1 shows an electrooptical mouse as is disclosed in detail in the aforementioned copending application Ser. No. 604,111 filed Apr. 26, 1984.

As shown in FIG. 1, the optical mouse device 100 includes a housing 1 having a base 12 with an aperture 121 at the bottom of the housing and which faces an image or object surface 6 with the base 12 of the housing 1 acting to shield the particular portion 61 of the object surface, which is below aperture 121, from ambient light.

The device also includes an associated mechanical microswitch 3 and pushbutton 2 and signal processing circuitry 9 which includes a plurality of light sensing dies situated along X and Y axes in a plane 10 constituting the sensing plane. Signals generated by the sensing dies are sent along conductors 11 to a computer or the like.

In order to provide light for sensing the particular object surface 61, LED's 4, 5 are provided. The LED's 4,5 are preferably infrared light emitters such as GI MEK 530 or 560. The lamps 4, 5 are disposed at an acute angle C with regard to the longitudinal axis of the light pipe 7, with angle C in the range of 30° to 60°, preferably 45°. While the device is shown with two light sources, a single light source can be used where the light source (LED) is disposed at one corner of light pipe 7 at the intersection of the X and Y sensing die arrays.

Figure 2:
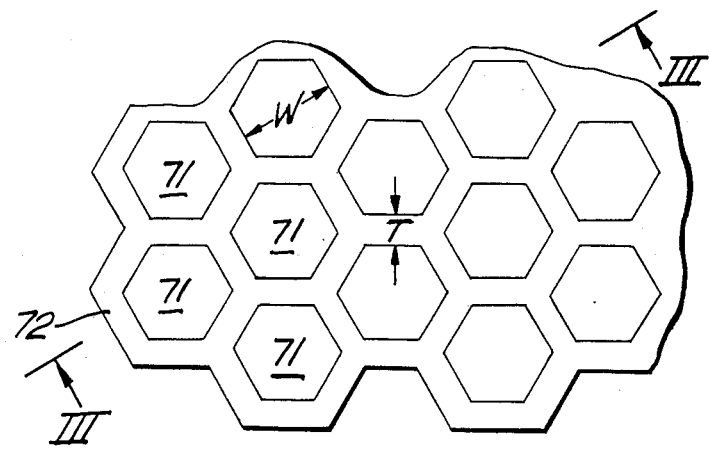
FIG. 2 is a top view of the light pipe according to the present invention.
Figure 3:
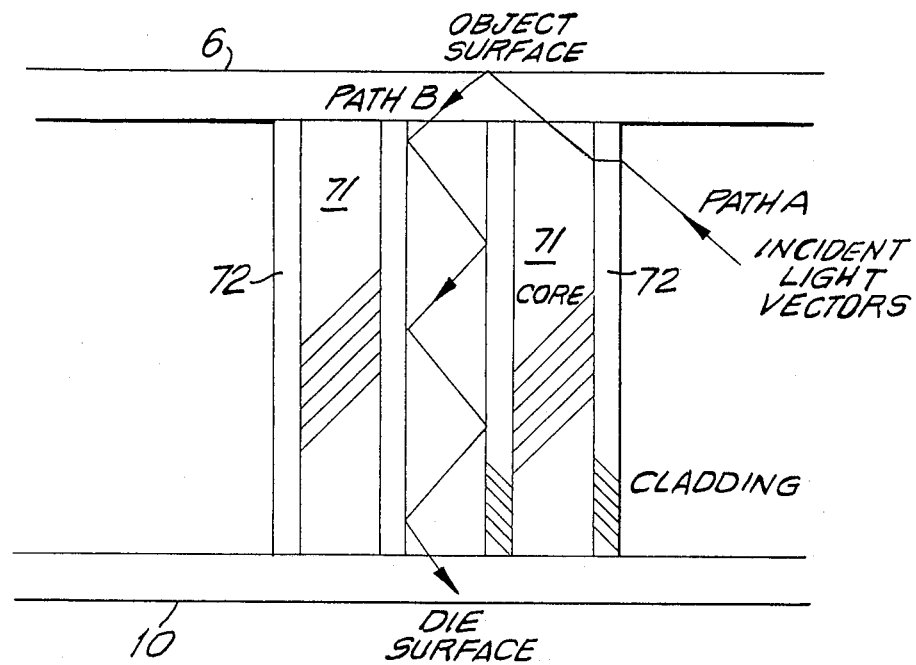
FIG. 3 is a sectional view along line III—III in FIG. 2 and showing the path of light therethrough.
Figure 4:
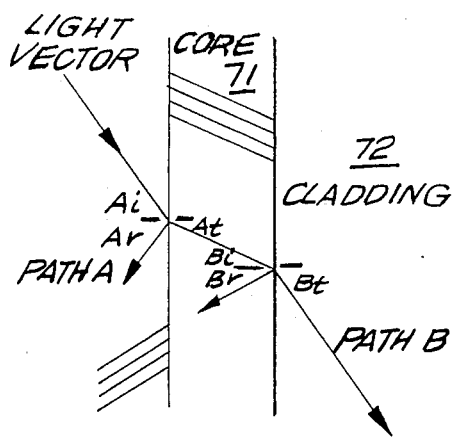
FIG. 4 is a detailed view of light vectors from FIGS. 3.

The fiberoptic light pipe 7 is disclosed in more detail in FIGS. 2-4.

The coherent fiberoptic light pipe comprises a plurality of cores 71 having cladding 72 therearound. The cores 71 are fibers having a preferably hexagonal cross section. However other cross section of fibers will work equally as well. The light pipe preferably is completely fused and therefore rigid, however, the block can be formed with only the end portions fused so that the block is non-rigid.

The cladding 72 in the present invention is light transmissive and in accordance with the invention the index of refraction of the cladding is lower than that of the core material. Preferably the index of refraction for the core is 1.60 and 1.50 for the cladding. As shown in FIGS. 3 and 4, the light pipe has two light transmitting modes, one for light from the outside along path A and one for light from the inside along path B. Any light incident on the exterior of the cladding will refract as it reaches each glass to glass interface. Light entering either the cladding or the core at each interface will be partially reflected and partially refracted. This is shown for light path A and light path B in FIG. 4. The ratio of the light reflected to the light refracted will depend on the incident angle.

The ratio of the light reflected to light refracted at each core-to-cladding interface is dependent on the angle of incidence ($A_i$ and $B_i$ in FIG. 4). Specifically Snell's law quantizes this relationship. This law states that $$Ni \cdot Sin(Ai) = Nt \cdot Sin(At)$$

where $Ni$ and $Nt$ are the indexes of refraction for the incident and transmitted materials, respectively. The Sin( ) is the trigonometric sine function. Derivatives of this law give $$Ai = Ar$$

where $Ai$ and $Ar$ are the incident and reflected angles, respectively. This is the normal rule that the angle of reflection equals the angle of incidence.

One can also derive another important quantity, the critical angle, $\delta c$, from this law. The critical angle is the angle when all of the incident light is reflected (the amount of transmitted light is identically zero). Or, when $$Ai \geq \delta c$$

then all light is reflected. The critical angle is defined as the angle of incidence, $Ai$, such that the transmitted angle, $At$, is $= 90$ degrees.

Since the index of refraction for the core material, Ncore, is greater than the index for the cladding, Nclad, then $At \leq Ai$. This means that there is no critical angle for the light going from cladding into the core (cladding-to-core interface). Some of the incident light will always pass through, into the core material. In contrast, since $Bt \geq Bi$ (core-to-cladding interface), critical angle, $\delta c$, can be shown to be given by:

$$Sin(c) = (Nclad)/(Ncore)$$

The principle of fiber optics is that $Bi$ is always $\geq \delta c$ for light vectors inside the core. This is done by making the diameter of the cores small. In FIG. 4, light entering the core through the cladding-to-core interface can never be totally trapped by the core ($Bi$ will never be $\geq \delta c$). This conclusion is based on application of Fermat's principle of reversibility and Snell's law, above. Conceptually, Fermat's principle of reversibility states that the light path passing through different materials is reversible (the path is not directional). In particular, the light path from the core back into the cladding (as the light reaches the other side of the core) is just the reverse path of the cladding-to-core path. So, $$Bi = At$$

and $$Bt = Ai$$

The result is that a light vector hitting the side of the optical coupler used in the mouse will bounce around, going through many of the cladding-to-core and core-to-cladding interfaces illustrated in FIG. 4. It will diffuse the light, but some of it will keep its general angle of travel, determined by the first $Ai$.

How the light enters the core material determines its mode (total internal reflection or reflection and refraction). For the incident source illumination (light directly from the infrared LEDs), there can never be total internal reflection, as shown as path A in FIG. 3). For the light reflected off of the image surface, some of the light will axially enter the cores (which are perpendicular to the paper) at a small enough angle to be trapped by total internal reflection as shown in path B in FIG. 3). This is the regular function of fiber optics, and the image gets translated to the other end of the fiber optic bundle at the die surface plane.

In conventional designs of light pipes having cladding, the cladding is generally opaque since light is transmitted only in the axial direction. Moreover, the thickness of the cladding is minimized in order to obtain the maximum amount of light transmitting area from the core.

In accordance with the present invention, in order to achieve the axial and radial transmission of light, the thickness of the cladding must be greater than the wavelength of the light from the light emitting LED's 4, 5. Moreover, the ratio of the thickness T of the cladding to the width W of the core must be within a given range in order to obtain the radial transmission of light and at the same time to achieve sufficient light transmission upwardly back to the sensing plane.

In one example, the light pipe is 235 mils by 200 mils and approximately $\frac{1}{4}''$ in length. The core width W is 15 microns to 25 microns and the cladding thickness is in the range of 1 to 5 microns. The core material is an N-type glass as is the cladding material.

In a particularly advantageous commercial embodiment, the wavelength of the LED light is 1 micron and the resolution of the individual dyes of the sensing plane is 25 microns. Thus the total width of the core and cladding must be less than 25 microns. In this embodiment, the core thickness W is 20 microns and the cladding thickness T is 2 microns so that the ratio of the width of the core to the thickness of the cladding is 10. The ratio must be from 4 to 24 and preferably 7 to 15.

It will be appreciated that the instant specification and claims are set forth by way of illustration and not limitation, and that various modifications and changes may be made without departing from the spirit and scope of the present invention.

What is claimed is:

1. In a device for optically sensing an image on a planar object surface, wherein the device has a planar base with an aperture therein framing a particular portion of the image on the object surface to be sensed and shielding said portion from ambient light, optical sensing means having a surface disposed substantially in a single plane and light transmission means for transmitting light from the object surface at the aperture to the sensing surface, the improvement wherein: the sensing surface is disposed parallel to the planar base and vertically aligned with the aperture; the light transmission means comprises a block of light transmitting fibers disposed between the sensing surface and the aperture, at least one light source disposed above the base and directing light of a given wavelength solely on the sides of the block at an acute angle; wherein the block comprises a plurality of parallel light transmissive regular polygonal fiber cores each surrounded by light transmissive cladding having a lower index of refraction than the core, wherein the thickness of the cladding is greater than the given wavelength of the light from the light source and the ratio of the width of the core to the thickness of the cladding ranges from 4 to 24.

2. The device according to claim 1, wherein the ratio ranges from 7 to 15.

3. The device according to claim 2, wherein the ratio is 10.

4. The device according to claim 1, wherein the core width is 15 to 25 microns and the cladding thickness is 1 to 5 microns.

5. The device according to claim 1, wherein the core material is N-type glass.

6. The device according to claim 1, wherein the block comprises fused rigid fibers.

7. The device according to claim 1, wherein the index of refraction of the core is 1.6 and the index of refraction of the cladding is 1.5.

* * * * *